Patented July 3, 1951

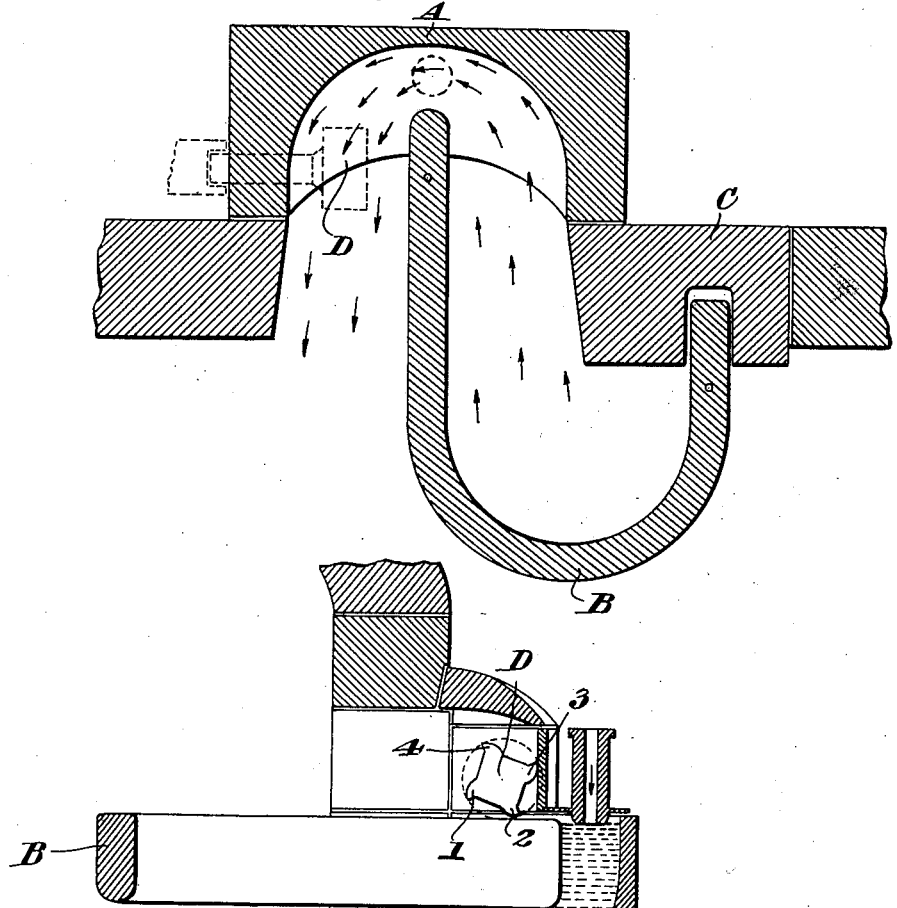
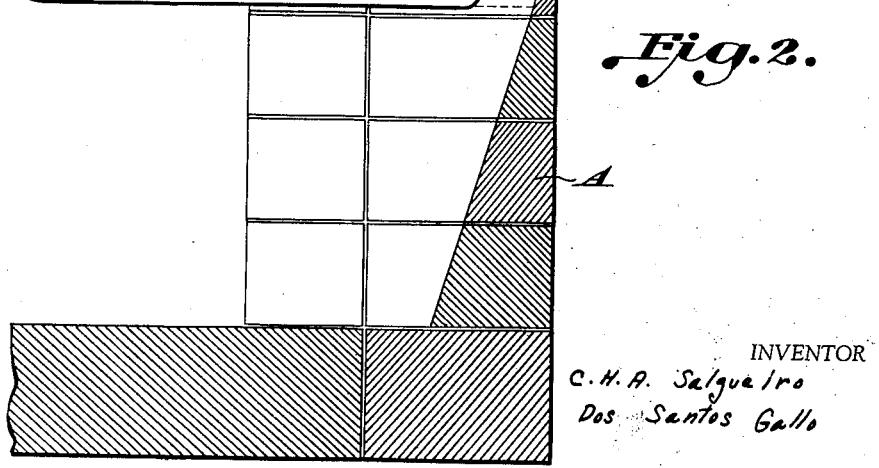

2,559,467

UNITED STATES PATENT OFFICE 2,559,467

SUPPLEMENTARY RESERVOIR FOR FEEDING AUTOMATIC BOTTLE-MAKING MACHINES OPERATING BY SUCTION

Carlos Horácio Amaro Salgueiro dos Santos Gallo, Marinha Grande, Portugal

Application April 19, 1949, Serial No. 88,264
In Portugal October 29, 1948

2 Claims. (Cl. 49—56)

In order to obtain satisfactory operation and a good output from automatic suction machines for the manufacture of bottles it is necessary that the mass of glass should retain the requisite fluidity.

This result is not adequately obtained by utilising the known systems, those in which shallow superficial deposits are used, or those in which there is a fixed partition through which the glass circulates under the action of paddles working in a vertical direction, which are immersed intermittently in the mass of glass and pushing the latter along in a parallel direction, or else employing an eccentric which produces a dislocation of the mass.

These systems have various disadvantages, both mechanical and physical, such for instance as the production of undulations in the mass of glass.

Similarly in the superficial receptacle at present employed in automatic suction machines, when the glass-impulsion device stops, the mass of glass in the receptacle immediately cools and solidifies, as is only to be expected.

In glass furnaces for ladling by hand, in view of the low temperature, the receptacles at present known give no satisfactory result, the mass of glass being unable to circulate because it is too cold, and consequently being unable to flow around the circuit of the receptacle, in which paddles or any other impelling means cannot work on account of the viscosity of the mass.

Consequently this plate process cannot be applied, as has been thought, except in special furnaces in which the temperature of the laboratory can be maintained at such a degree as to enable the desired results to be obtained.

The device that forms the subject of the present invention enables a furnace of any type to be used, and eliminates the disadvantages pointed out above, seeing that the mass of glass always maintains the fluidity necessary for the ladling thereof.

According to the invention the furnace is provided with a supplementary reservoir, which permits of the work being intermittent and of the device for the impulsion of the mass of glass being stopped without the glass cooling and solidifying.

Thanks to the supplementary reservoir that forms the subject of the present invention, if the furnace remains at the appropriate temperature it will be possible to work, since the mass of glass will always remain fluid, the temperature in the furnace and in the supplementary reservoir being equalised by the fact that the latter occupies a certain depth of the furnace, and that consequently the mass of glass occupying the supplementary reservoir receives a constant supply of heat by radiation from the mass of glass contained in the furnace.

In this way, by means of this invention, it is possible to obtain a flow of the glass along the passage in which the machine is operating, with a motion which is semi-continuous or rotary, and not intermittent, like that which exists at present.

The invention is illustrated by way of example in the accompanying drawings, in which:

Figure 1 is a horizontal section through the machine of the invention, and

Figure 2 is a sectional view through the machine.

As will be gathered from the drawings, a supplementary reservoir A is arranged adjacent to the furnace in such a way that it can receive heat radiated by the mass of glass contained in the furnace.

In the known deposits or plates there is a fixed partition through which the glass circulates, but in the supplementary reservoir according to the invention a floating U-shaped partition B is provided, which enables the glass that is to be worked to be more uniformly and more thoroughly heated, this partition being made of refractory material. One of the limbs of the U-shaped partition lodges in the furnace wall C, the other limb being prolonged to the interior of the reservoir A. The circulation of the mass of glass in the reservoir is established through the medium of a rotatable device D, actuated by any appropriate means, and preferably provided with paddle blades 1, 2, 3 and 4. This paddle device may however be replaced by a revolving cylinder or drum, which, by bearing upon the surface of the glass, constrains it to flow.

Having now particularly described and ascertained the nature of my said invention and in what manner the same is to be performed, I declare that what I claim is:

1. In a device for feeding automatic bottle-making machines operating by suction, a furnace, a supplementary reservoir extending externally from the front wall of said furnace and having a depth approximately equal to that of said furnace, a U-shaped floating partition of refractory material in said supplementary reservoir having one arm thereof extending beyond the other, said furnace having a cavity in a wall thereof, the shorter limb of said partition being lodged in said cavity in said furnace wall, the extended limb of said partition extending into the interior of said supplementary reservoir and forming therein a passage for the circulation of glass, a mass of glass contained in said reservoir receiving, by radiation of heat from a mass of glass contained in the furnace, the temperature requisite for maintaining the fluidity of the glass required for feeding the suction device.

2. In a device for feeding automatic bottle-making machines operated by suction as claimed in claim 1, a circulation device for circulating the mass of glass in said reservoir, said device comprising a roller having blades peripherally arranged thereon, said blades contacting the surface of the mass of glass and imparting thereto a circulating movement in said reservoir.

CARLOS HORÁCIO AMARO SALGUEIRO
DOS SANTOS GALLO.

REFERENCES CITED

The following references are of record in the file of this patent:

UNITED STATES PATENTS

| Number | Name | Date |
|---|---|---|
| 1,927,101 | Stenhouse | Sept. 19, 1933 |
| 1,959,417 | Flexon | May 22, 1934 |
| 2,154,535 | Schutz | Apr. 18, 1939 |
| 2,191,733 | Tremblay | Feb. 27, 1940 |

FOREIGN PATENTS

| Number | Country | Date |
|---|---|---|
| 315,345 | Great Britain | Oct. 31, 1929 |